US012715466B2

(12) United States Patent
Zavala-Jurado et al.

(10) Patent No.: US 12,715,466 B2
(45) Date of Patent: Aug. 25, 2026

(54) BACKUP TRAJECTORY CONVERTER FOR CONTROLLING A VEHICLE

(71) Applicant: Arriver Software, LLC, Novi, MI (US)

(72) Inventors: Jose Carlos Zavala-Jurado, Brighton, MI (US); Yimeng Dong, Northville, MI (US); Amol Rajendra Birhade, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 18/450,817

(22) Filed: Aug. 16, 2023

(65) Prior Publication Data

US 2024/0067212 A1 Feb. 29, 2024

Related U.S. Application Data

(60) Provisional application No. 63/374,208, filed on Aug. 31, 2022.

(51) Int. Cl.

*B60W 60/00* (2020.01)
*B60W 40/072* (2012.01)
*B60W 50/029* (2012.01)

(52) U.S. Cl.

CPC ........ *B60W 60/001* (2020.02); *B60W 40/072* (2013.01); *B60W 50/029* (2013.01); *B60W 2050/0292* (2013.01)

(58) Field of Classification Search

CPC .. B60W 30/045; B60W 40/072; B60W 50/02; B60W 50/029; B60W 60/0015; B60W 60/0016; B60W 60/0017; B60W 60/0018; B60W 60/00186; B60W 2050/0292; B60W 2520/06; B60W 2520/14

See application file for complete search history.

(56) References Cited

U.S. PATENT DOCUMENTS

2005/0261851 A1* 11/2005 Buck ...................... G01C 21/26 702/94
2021/0311479 A1* 10/2021 Kumar ................ B60W 60/001
2022/0089161 A1* 3/2022 Takebayashi ... B60W 30/18145

FOREIGN PATENT DOCUMENTS

CN 110362088 A * 10/2019 ........... G05D 1/0214
CN 113104037 A * 7/2021 ...... B60W 30/18009

* cited by examiner

*Primary Examiner* — Erin D Bishop
*Assistant Examiner* — Alex B Griffin
(74) *Attorney, Agent, or Firm* — Polsinelli

(57) ABSTRACT

Systems and techniques control one or more operations of a vehicle. For example, according to some aspects, a process may include determining a path associated with the vehicle and determining at least two points on the path located closest to a pose of the vehicle. The process may include determining a measurement point on a segment between at least two points that is closest to the pose of the vehicle. The process may further include determining a lateral offset, a heading offset, and/or a curvature of the path based on at least two points and the measurement point.

27 Claims, 13 Drawing Sheets

200
250
260
Backup Trajectory Converter Engine 210
270
Platform Switch 220
280
Lateral Controller Engine 230
290
Vehicle Control Output Engine 240
295

BACKUP TRAJECTORY CONVERTER FOR CONTROLLING A VEHICLE

PRIORITY CLAIM

This application claims the benefit of U.S. Provisional Application No. 63/374,208, filed on Aug. 31, 2022, which is hereby incorporated by reference, in its entirety and for all purposes.

FIELD OF THE DISCLOSURE

The present disclosure generally relates to controlling a vehicle (e.g., for autonomously or partially-autonomously controlling vehicle). For example, aspects of the present disclosure are related to generating a path for a vehicle controller (e.g., including a backup trajectory converter) for controlling a path of a vehicle.

BACKGROUND OF THE DISCLOSURE

An automated vehicle or partially-automated vehicle (also referred to as a semi-automated vehicle) includes one or more automation capabilities that allow the vehicle to autonomously perform one or more functions without requiring the user to interact with or control the vehicle. For example, an automated or partially-automated vehicle may include a vehicle control system that can steer the vehicle to follow a determined path to a destination without requiring a user to control the steering wheel of the vehicle.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Systems and techniques are described for controlling a vehicle. According to at least one example, a method is provided for controlling a vehicle. The method includes: determining a path associated with the vehicle; determining at least two points on the path located closest to a pose of the vehicle; determining a measurement point on a segment between at least two points that is closest to the pose of the vehicle; and determining a curvature of the path based on at least two points and the measurement point.

In another example, an apparatus for controlling a vehicle is provided that includes at least one memory and at least one processor (e.g., configured in circuitry) coupled to the at least one memory. The at least one processor is configured to: determine a path associated with the vehicle; determine at least two points on the path located closest to a pose of the vehicle; determine a measurement point on a segment between the at least two points that is closest to the pose of the vehicle; and determine a curvature of the path based on the at least two points and the measurement point.

In another example, a non-transitory computer-readable medium of a vehicle is provided that has stored thereon instructions that, when executed by one or more processors, cause the one or more processors to: determine a path associated with the vehicle; determine at least two points on the path located closest to a pose of the vehicle; determine a measurement point on a segment between the at least two points that is closest to the pose of the vehicle; and determine a curvature of the path based on the at least two points and the measurement point.

In another example, an apparatus for generating virtual content at a first device in a distributed system is provided. The apparatus includes: means for determining a path associated with the vehicle; means for determining at least two points on the path located closest to a pose of the vehicle; means for determining a measurement point on a segment between the at least two points that is closest to the pose of the vehicle; and means for determining a curvature of the path based on the at least two points and the measurement point In some aspects, one or more of the apparatuses described above is or is part of a vehicle (e.g., a computing device of a vehicle), a robotics device, an extended reality device (e.g., a virtual reality (VR) device, an augmented reality (AR) device, or a mixed reality (MR) device), a mobile device (e.g., a mobile telephone or so-called "smart phone" or other mobile device), a wearable device, and/or any other device with automation capabilities. In some aspects, the apparatus further includes a display for displaying one or more images, notifications, and/or other displayable data. In some aspects, the apparatus can include one or more sensors, such as one or more sensors that can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
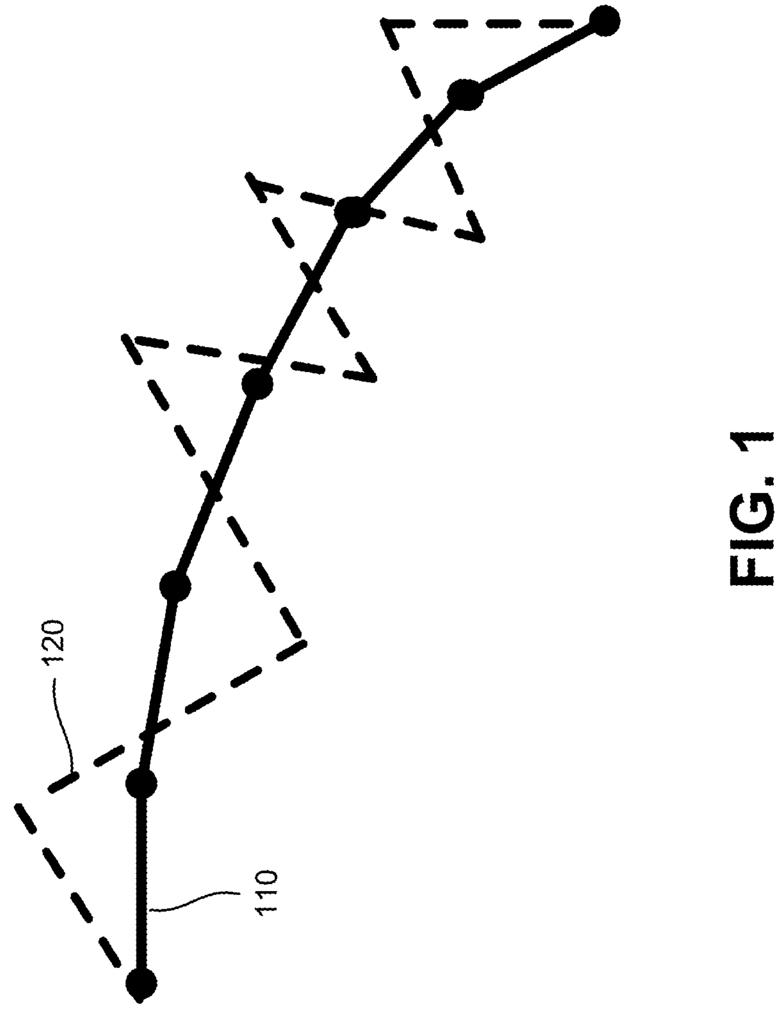
FIG. 1 is a diagram illustrating an example of a path of a vehicle that exhibits oscillations, in accordance with some aspects of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously noted, an automated vehicle or partially-automated vehicle includes one or more automation capabilities, which allow the vehicle to autonomously perform one or more functions without requiring the user interact with or control the vehicle. An automated or partially-automated vehicle may include a vehicle control system that can steer the vehicle to follow a determined path to a destination without requiring a user to control the steering wheel of the vehicle.

One example of a subcomponent that can be used as part of the vehicle control system for controlling the path of the vehicle is a backup trajectory converter. In some cases, a backup trajectory converter may perform one or more operations to generate the path of the vehicle during a critical failure of the vehicle. Types of critical failures of a vehicle may include, but are not limited to, a lack of a Global Positioning System (GPS) signal for positioning of the vehicle, a hardware (e.g., a sensor, such as a camera) failure, and a communication failure.

In some cases, when a critical failure within a vehicle occurs, the vehicle may respond by performing a safety maneuver, referred to as a "blind stop." During the blind stop maneuver (e.g., a dead reckoning during a critical failure), the vehicle control system will cause the vehicle to slow down along a path the vehicle is currently following until the vehicle comes to a full stop. While the vehicle is slowing down, the vehicle control system can attempt to control the vehicle so that it continues to follow its current path (e.g., which can be referred to as a backup path) while remaining centered around that path.

The backup trajectory converter of the vehicle control system provides a path to the lateral controller of the vehicle during a blind stop maneuver. In some current vehicle control systems, a backup trajectory converter may employ, for lateral control, a transformation of trajectory points to a vehicle frame, a calculation of latitude and longitudinal speeds of trajectory points, and/or the use of splines for vehicle positioning. Using such techniques can cause the vehicle to experience lateral oscillations, which can have the negative effect of causing the vehicle to traverse laterally to the left and to the right of the path.

Systems, apparatuses, processes (also referred to as methods), and computer-readable media (collectively referred to as "systems and techniques") are described herein for providing a backup trajectory converter that can provide a path to the controller for a vehicle (e.g., during a blind stop or other maneuver). In one or more aspects, the disclosed backup trajectory converter includes logic to resolve the issue of lateral control oscillations associated with a deficient control reference in the current lateral control systems.

According to one or more aspects described herein, the backup trajectory converter logic may generate path information based on an absolute frame (e.g., an absolute path in an absolute coordinate frame). In one example, the backup trajectory converter can convert trajectory points into an absolute path. For example, as described in more detail herein, delta points may be obtained (e.g., each delta point being obtained as a distance in x- and y-directions from a previous delta point). The absolute path may be formed by incrementally concatenating the delta points to generate a single trajectory. The absolute path provides a path for the vehicle to follow. The backup trajectory converter engine may determine a higher resolution absolute path for the vehicle to follow, such as by interpolating points on the absolute path to determine additional interpolation points. The backup trajectory converter engine may determine a number of points (e.g., two points, three points, etc.) on the higher resolution absolute path, such as two points $p_1$ and $p_2$, that are located closest to a determined pose (e.g., position and, in some cases, orientation) of the vehicle. The vehicle pose can be referred to as pose $p_3$. The backup trajectory converter engine may then determine or calculate a point $p_4$ (which may be referred to as a measurement point) located on a segment formed from the determined number of points (e.g., the two points $p_1$ and $p_2$) that is located closest to the vehicle pose. The backup trajectory converter engine may also determine or calculate $p_5$ as the point on the trajectory located closest to $p_4$.

The backup trajectory converter engine can determine a lateral offset between the trajectory and the vehicle pose $p_3$ based on the number of points (e.g., the two points $p_1$ and $p_2$), the determined points $p_4$, $p_5$, and the vehicle pose $p_3$. The backup trajectory converter engine can further determine a heading offset by using an interpolated heading from the determined number of points (e.g., the two points $p_1$ and $p_4$) and the vehicle pose $p_3$. For instance, the heading offset can indicate how misaligned (or aligned) the vehicle heading is with respect to the path. The backup trajectory converter engine may then determine or calculate a curvature of the path. The backup trajectory converter engine can then output a final backup path including the lateral offset, the heading offset, and the curvature of the estimated path.

The systems and techniques described herein provide a smoother or less noisy reference for lateral control tracking than current lateral control systems (e.g., the current backup trajectory converters), resulting in a smooth vehicle behavior (e.g., without lateral oscillations). For example, the backup trajectory converter logic eliminates the need to convert the trajectory to a vehicle frame, as is performed by some current backup trajectory converters. The backup trajectory converter logic also eliminates the use of splines for path determination, which are employed by some current backup trajectory converters. The elimination of the use of splines can remove some of the high frequency noise artifacts in the path, which can lead to the lateral oscillations.

Various aspects of the application will be described with respect to the figures.

FIG. 1 is a diagram 100 illustrating an example of a path 120 of a vehicle that exhibits oscillations. In particular, FIG. 1 shows a path 120 of a vehicle with lateral oscillations against a path 110 of a vehicle with no oscillations. The path 120 of the vehicle with oscillations shows that the path 120 will cause the vehicle to deviate (e.g., drive laterally to the left and to the right, such as in a zig-zag pattern) from the path 110 with no oscillations.

Figure 2:
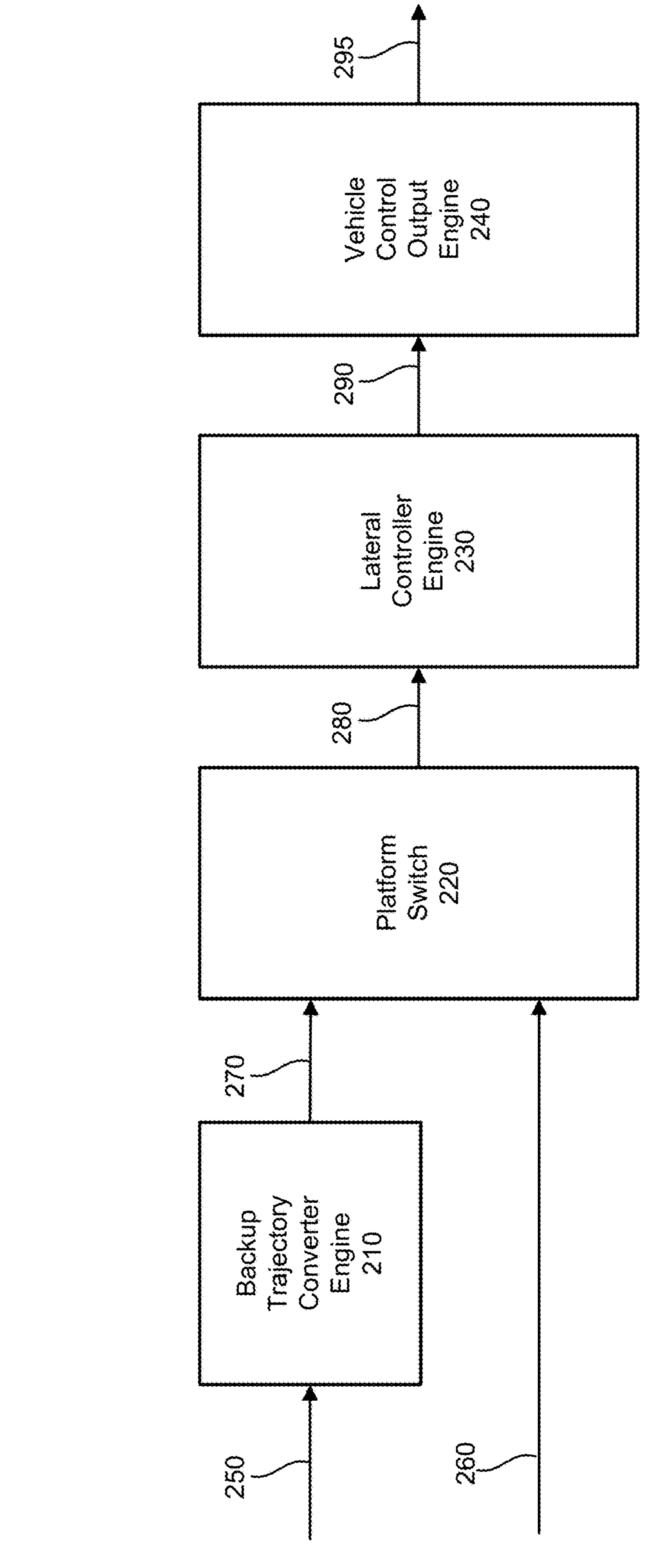
FIG. 2 is a block diagram illustrating an example of a safe vehicle control (SVC) for a vehicle, in accordance with some aspects of the present disclosure.

FIG. 2 is a block diagram illustrating an example of a safe vehicle control (SVC) 200 for a vehicle. The SVC 200 may be one of many components of a driver-assist vehicle control system of the vehicle. The SVC 200 can provide lateral control during both a normal mode operation and a blind stop maneuver (e.g., a blind stop mode) for the vehicle. The SVC 200 can also provide longitudinal control of the vehicle during blind stops (e.g., blind stop maneuvers). As previously mentioned, when a critical failure within a vehicle occurs, the vehicle will respond by performing a "blind stop" safety maneuver, which will cause the vehicle to slow down in its path that it is currently following to a full stop. Types of critical failures of a vehicle may include, but are not limited to, a lack of a GPS signal for positioning of the vehicle, a hardware (e.g., a sensor, such as a camera) failure, and a communication failure. Normal mode operation of a vehicle may occur when the vehicle is operating properly (e.g., all of the vehicle's subsystems and components are operating seamlessly and not experiencing any critical failures).

In FIG. 2, the SVC 200 may include a plurality of different subcomponents. The different subcomponents that the SVC 200 may include, but are not limited to, are a backup trajectory converter engine 210, a platform switch 220, a lateral controller engine 230, and a vehicle control (VC) output engine 240. The SVC 200 may include more or less subcomponents than as shown in FIG. 2, and/or may include different types of subcomponents than as shown in FIG. 2.

The backup trajectory converter engine 210 can receive one or more inputs 250, which may include a trajectory (e.g., defined by one or more trajectory points), the vehicle speed, and the vehicle pose. The trajectory may be referred to as "an absolute path" or a "backup trajectory." An absolute path (or backup trajectory) is a sequence of points (x, y) (referred to as delta points) that form a single trajectory in an absolute frame (e.g., where the coordinate system is not dependent on the vehicle position) and that is composed by the incremental concatenation of segments with x, y coordinates. For example, each delta point may be obtained as a distance in x- and y-directions from a previous delta point, and the absolute path may be formed by concatenating the delta points together in an incremental way to create a single trajectory. The absolute path or backup trajectory can thus include delta points in x, y, and can also include a heading. The delta points in x, y can indicate the location of where the vehicle should be located. The heading can indicate the angle that the vehicle should be heading. An x-axis for the delta points and heading may be designated to be parallel to the front of the vehicle, and a y-axis for the delta points and heading can be designated to be perpendicular to the x-axis.

The backup trajectory converter engine 210 can convert the absolute path or backup trajectory to backup path information (e.g., a backup path 270) that can be used by the lateral controller engine 230 (e.g., to keep the vehicle on the backup path). The backup trajectory converter engine 210 is located within the SVC 200 in order to isolate the backup trajectory converter engine 210 from other failures that may occur upstream in the driver-assist vehicle control system of the vehicle so that the SVC 200 may continue to operate. The process of the conversion of the absolute path to the backup path 270 by the backup trajectory converter engine 210 will be discussed in further detail in the descriptions of FIGS. 3 through 11.

The platform switch 220 of the SVC 200 can switch between receiving an input of a backup path 270 (e.g., which may be outputted from the backup trajectory converter engine 210) and an input of a normal path 260 (e.g., normal path information). A motion planner (not shown) of the driver-assist vehicle control system can create the normal path 260 for the vehicle to follow as well as the absolute path (e.g., which may be part of the one or more inputs 250). The normal path 260 and the backup path 270 may be created using information, which may include, but is not limited to, a high definition (HD) map, the position of the vehicle based on GPS, and/or the position of the vehicle based on sensor data from one or more sensors (e.g., light-detection and ranging (LIDAR) sensors, radar sensors and/or image sensors, such as cameras). The difference between the normal path 260 and the backup path 270 is that, when a critical failure occurs, the update to the recorded backup trajectory is frozen. The occurrence of a critical failure can trigger the storing of the absolute path.

The normal path 260 can indicate to the vehicle the lateral offset of the vehicle (e.g., how far the vehicle is located away from a desired trajectory), the heading offset (e.g., how wide in angle the vehicle is heading away from the desired trajectory), and the curvature of the road. During normal operation, all of the sensors of the vehicle are active and, as such, the vehicle is able to know its own location. Conversely, the backup trajectory can indicate to the vehicle points on the road. The backup trajectory does not indicate to the vehicle where the points are located with respect to the vehicle.

During operation of the vehicle, when the vehicle is operating properly (e.g., there are no critical failures), the vehicle (e.g., SVC 200) can operate in normal mode. During normal mode operation, the platform switch 220 of the SVC 200 can switch such that the platform switch 220 receives the input of the normal path 260 and the platform switch 220 outputs an output 280 of the normal path to the lateral controller engine 230. The backup trajectory converter engine 210 is not active (e.g., not utilized) during normal mode operation of the vehicle.

During operation of the vehicle, when the vehicle experiences a critical failure, the vehicle can perform a blind stop maneuver and the vehicle (e.g., SVC 200) can operate in a blind stop mode. During the blind stop mode, the platform switch 220 of the SVC 200 can switch such that the platform switch 220 receives the input of the backup path 270 and the platform switch 220 outputs an output 280 of the backup path to the lateral controller engine 230. As such, during the blind stop mode, the backup trajectory converter engine 210 is active and utilized to provide the backup path to the lateral controller engine 230.

Based on the lateral controller engine 230 receiving the output 280 (e.g., including the backup path 270 or the normal path 260), the lateral controller engine 230 can use the output 280 (e.g., the backup path 270 or the normal path 260) as a reference path, and determine a control 290 (e.g., a calculated front wheel angle) for the vehicle in order for the vehicle to track the reference path. The lateral controller engine 230 can output the determined control 290 to the VC output engine 240. Based on the VC output engine 240 receiving the control 290 from the lateral controller engine 230, the VC output engine 240 can output a control request 295 for that particular control 290 (e.g., the calculated front wheel angle).

Figure 3:
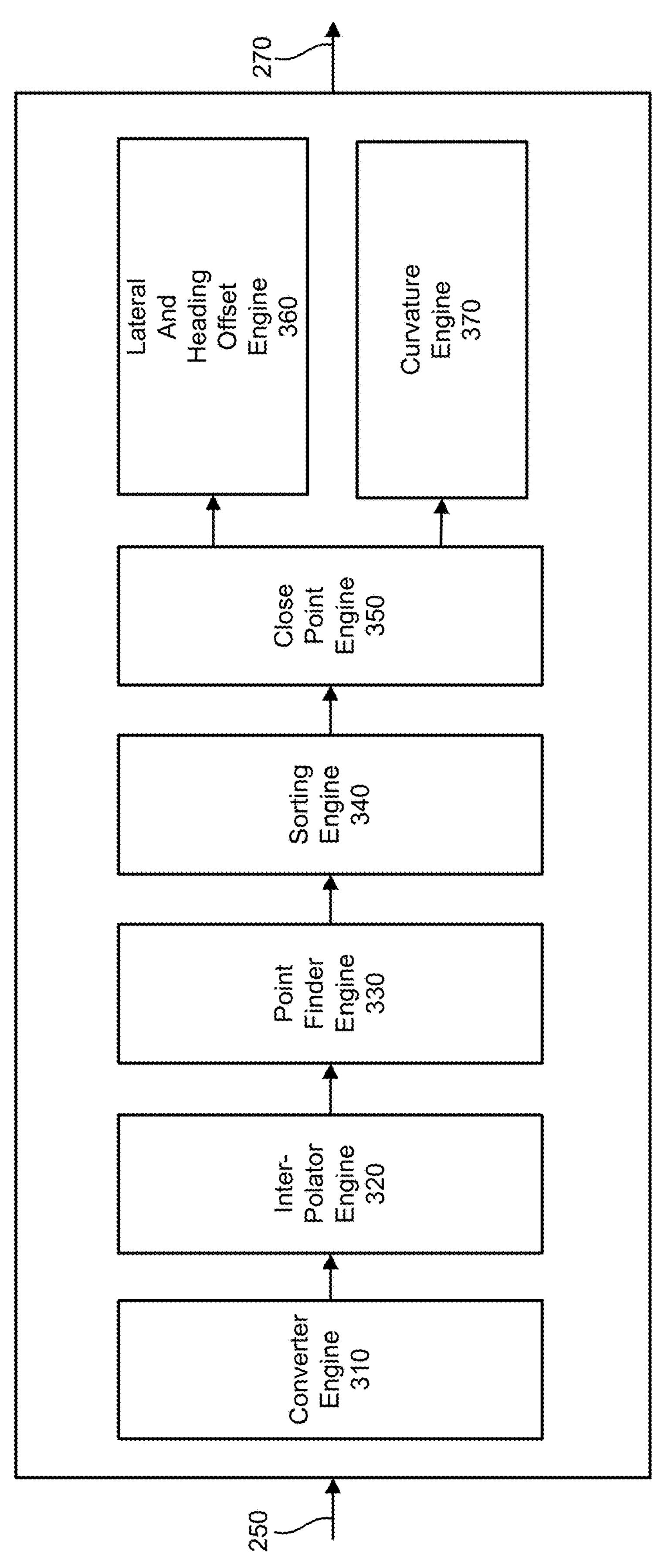
FIG. 3 is a block diagram illustrating an example of a backup trajectory converter engine of the SVC of FIG. 2, in accordance with some aspects of the present disclosure.

FIG. 3 is a block diagram illustrating an example of a backup trajectory converter engine 210 of the SVC 200 of FIG. 2. In FIG. 2, the backup trajectory converter engine 210 may include plurality of different engines. The different engines that the backup trajectory converter engine 210 may include, but are not limited to, are a converter engine 310, an interpolator engine 320, a point finder engine 330, a sorting engine 340, a close point engine 350, a lateral and heading offset engine 360, and a curvature engine 370. The backup trajectory converter engine 210 may include more or less engines than as shown in FIG. 3, and/or may include different types of engines than as shown in FIG. 3.

As previously mentioned, during a critical failure, the SVC 200 can operate in a blind stop mode. During the blind stop mode of operation, the backup trajectory converter engine 210 can convert the received one or more inputs 250 (e.g., a trajectory, the vehicle speed, and the vehicle pose) into a backup path 270, which can be outputted by the backup trajectory converter engine 210.

Figure 4:
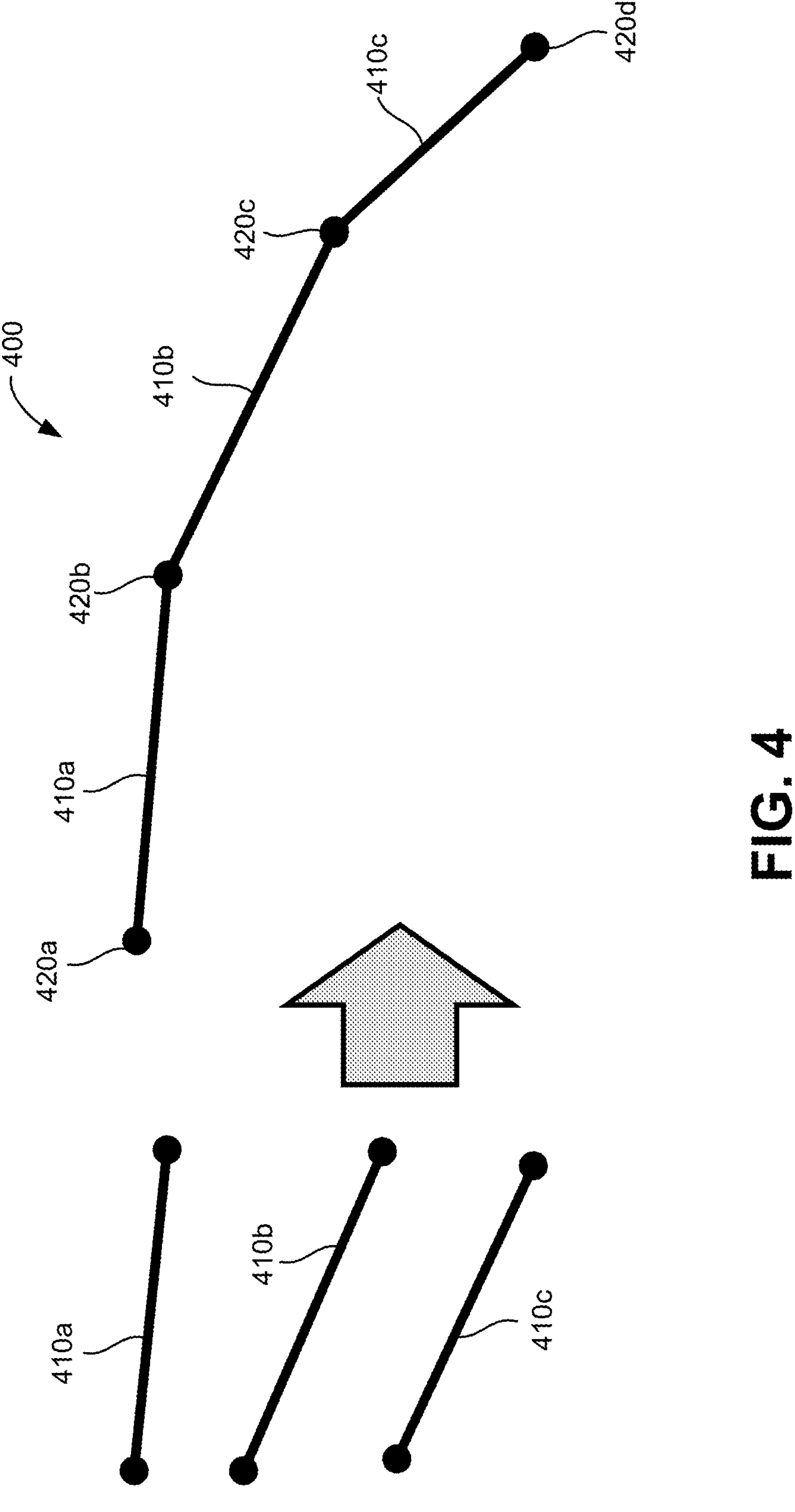
FIG. 4 is a diagram illustrating a first step of logic that may be performed by a backup trajectory converter engine, where trajectory points are converted into an absolute path, in accordance with some aspects of the present disclosure.

Once the backup trajectory converter engine 210 receives the one or more inputs 250, the converter engine 310 of the backup trajectory converter engine 210 can obtain or receive the inputs 250 and can convert trajectory points from the inputs 250 (e.g., forming trajectory segments) into an absolute path (also referred to as a backup trajectory). For example, FIG. 4 shows an example of trajectory segments (e.g., first trajectory segment 410*a*, second trajectory segment 410*b*, and third trajectory segment 410*c*) being converted into an absolute path 400. In FIG. 4, the trajectory segments 410*a*, 410*b*, 410*c* are shown to be converted (e.g., by the converter engine 310) into an absolute path 400. In some cases, the converter engine 310 can link (e.g., assemble) the trajectory segments 410*a*, 410*b*, 410*c* together one after another to form the absolute path 400. The absolute path 400 can provide an absolute path (e.g., a path that does not depend upon any other inputs) for the vehicle to follow. In FIG. 4, the absolute path 400 includes the points 420*a*, 420*b*, 420*c*, 420*d* (also referred to as delta points). The point 420*a* of the absolute path 400 can be defined as an origin point 420*a* located at (0,0), which is equal to zero in x, and zero in y.

Figure 5:
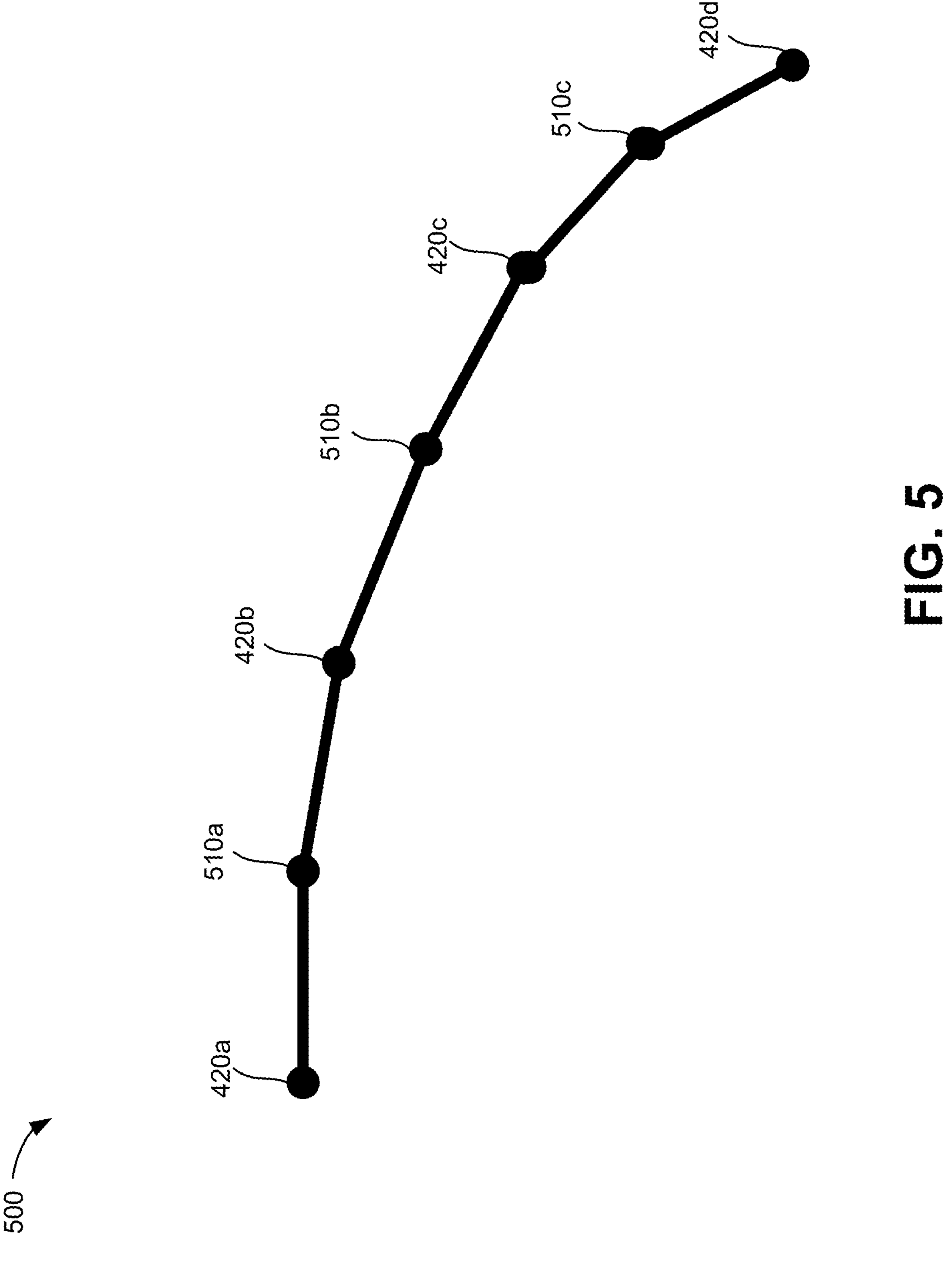
FIG. 5 is a diagram illustrating a second step of logic that may be performed by a backup trajectory converter engine, where interpolation is performed of the absolute path for a higher resolution, in accordance with some aspects of the present disclosure.

Based on the converter engine 310 of the backup trajectory converter engine 210 converting the trajectory points (e.g., forming trajectory segments 410*a*, 410*b*, 410*c*) into an absolute path 400, the interpolator engine 320 of the backup trajectory converter engine 210 can interpolate points 420*a*, 420*b*, 420*c*, 420*d* on the absolute path 400 to determine additional interpolation points 510*a*, 510*b*, 510*c* to obtain a higher resolution absolute path 500 for the vehicle to follow. FIG. 5 shows an example of a higher resolution absolute path 500 including additional interpolation points 510*a*, 510*b*, 510*c*, which are each located between two of the original points 420*a*, 420*b*, 420*c*, 420*d*.

Figure 6:
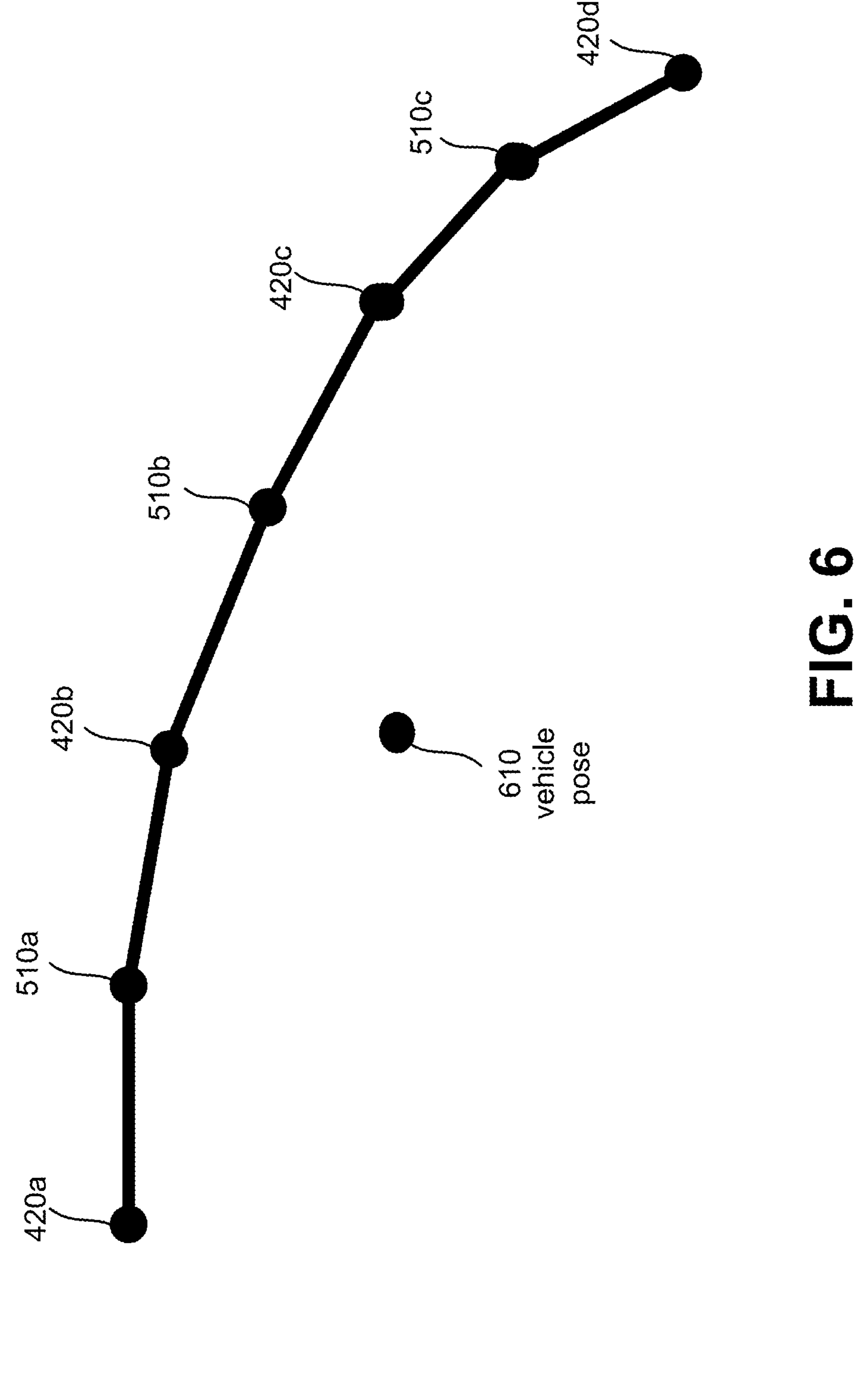
FIG. 6 is a diagram illustrating a third step of logic that may be performed by a backup trajectory converter engine, where path points located closest to the vehicle are determined, in accordance with some aspects of the present disclosure.

Based on the interpolator engine 320 interpolating points 420*a*, 420*b*, 420*c*, 420*d* on the absolute path 400 to determine additional interpolation points 510*a*, 510*b*, 510*c* to obtain a higher resolution absolute path 500, the point finder engine 330 of the backup trajectory converter engine 210 can sort the distances of all of the points 420*a*, 420*b*, 420*c*, 420*d*, 510*a*, 510*b*, 510*c* on the higher resolution absolute path 500 with respect to a vehicle pose 610 (e.g., which can be denoted as $p_3$). The interpolation points 510*a*, 510*b*, and 510*c* can be determined using any type of interpolation technique. In one illustrative example, the interpolation points 510*a*, 510*b*, and 510*c* can be determined using piecewise cubic interpolation. Based on the point finder engine 330 of the backup trajectory converter engine 210 sorting the distances of all of the points 420*a*, 420*b*, 420*c*, 420*d*, 510*a*, 510*b*, 510*c* on the higher resolution absolute path 500, the point finder engine 330 of the backup trajectory converter engine 210 may determine two points 420*b*, 510*b* (e.g., which can be denoted as $p_1$ and $p_2$, respectively) on the higher resolution absolute path 500 that are located closest to the vehicle pose 610 ($p_3$). FIG. 6 shows an example of the higher resolution absolute path 500 with the two points 420*b*, 510*b* that are located closest to the vehicle pose 610 ($p_3$).

Figure 7:
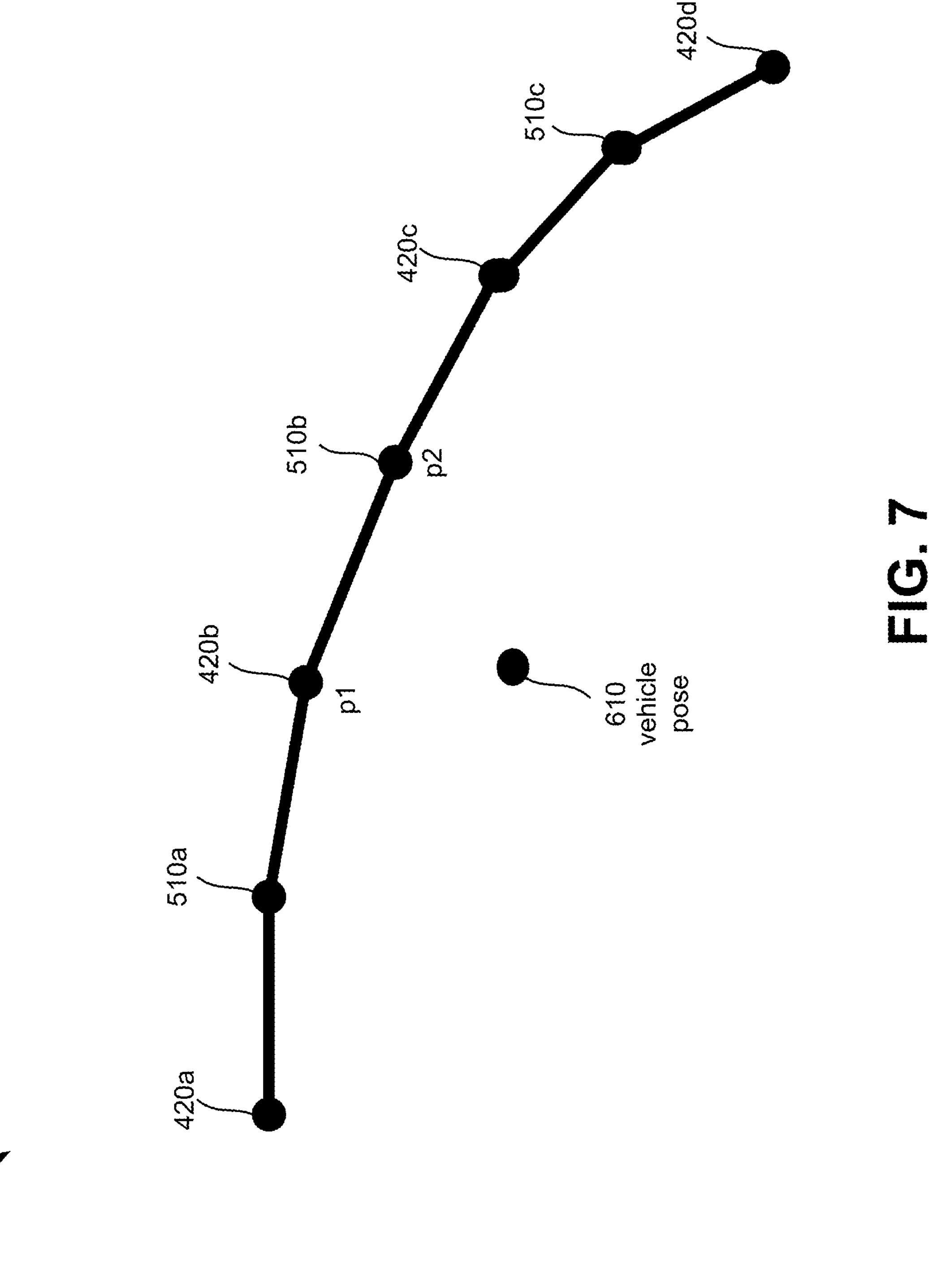
FIG. 7 is a diagram illustrating a fourth step of logic that may be performed by a backup trajectory converter engine, where path points are sorted according to their path position, in accordance with some aspects of the present disclosure.

Based on the point finder engine 330 of the backup trajectory converter engine 210 determining the two points 420*b*, 510*b* on the higher resolution absolute path 500 that are located closest to the vehicle pose 610 ($p_3$), the sorting engine 340 of the backup trajectory converter engine 210 can sort the two points 420*b*, 510*b* to determine the position (e.g., order) of the points in the higher resolution absolute path 500. In particular, the sorting engine 340 of the backup trajectory converter engine 210 can sort the two points 420*b*, 510*a* to determine which point of the two points 420*b*, 510*a* is located first in the higher resolution absolute path 500. FIG. 7 shows an example of the higher resolution absolute path 500 with the two points 420*b*, 510*b* that are located closest to the vehicle pose 610 ($p_3$). In the example of FIG. 7, the sorting engine 340 of the backup trajectory converter engine 210 can determine that point 420*b* is located closer to the origin point 420*a* than point 510*b*. Since the sorting engine 340 of the backup trajectory converter engine 210 determines that point 420*b* is located closer to the origin point 420*a* than point 510*b*, the sorting engine 340 of the backup trajectory converter engine 210 can denote point 420*b* as $p_1$ and point 510*b* as $p_2$ in order to conform with the positioning (e.g., ordering) of the points.

Figure 8:
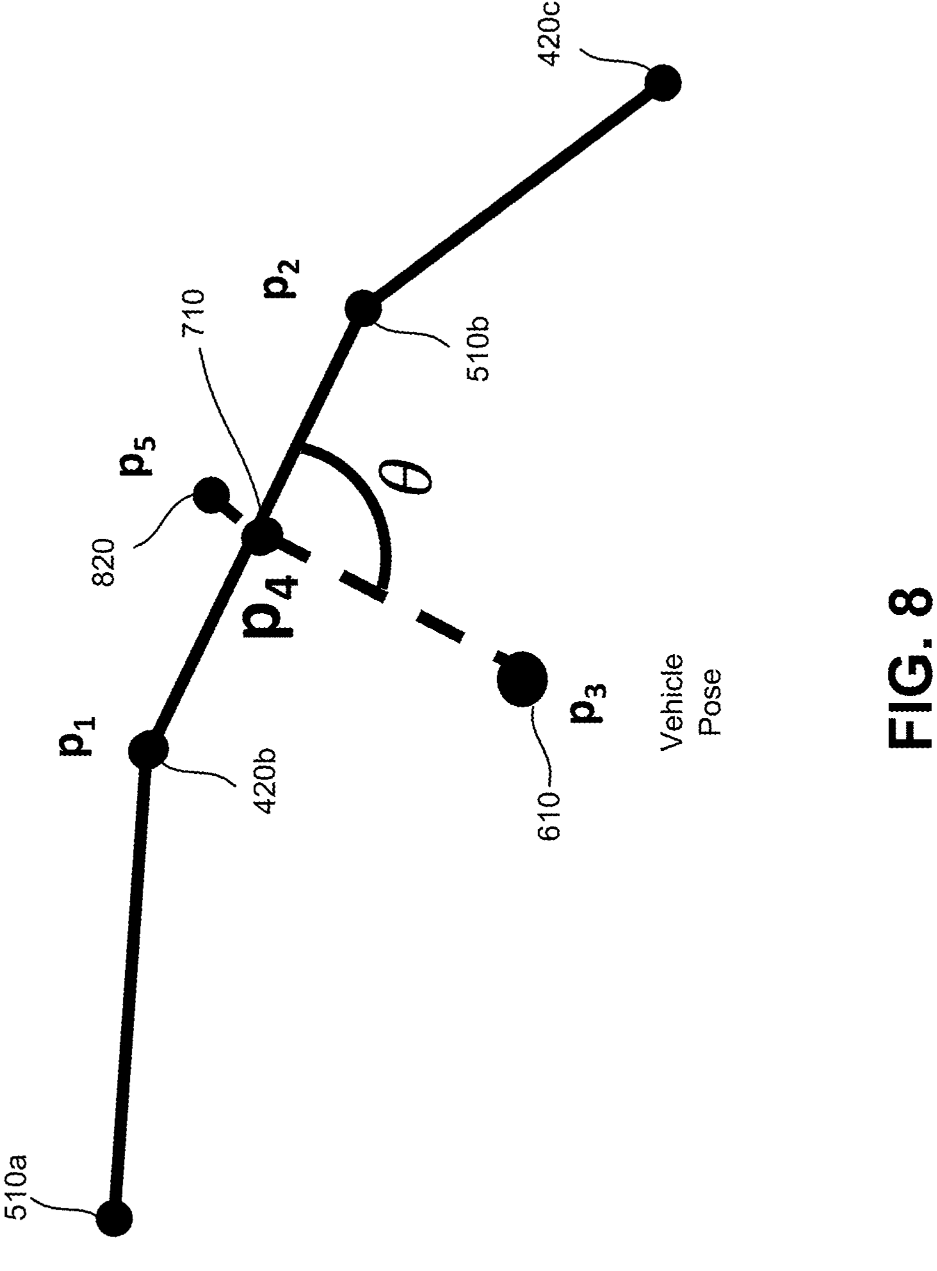
FIG. 8 is a diagram illustrating a fifth step of logic that may be performed by a backup trajectory converter engine, where a point located closest to the vehicle is determined, in accordance with some aspects of the present disclosure.

Based on the sorting engine 340 of the backup trajectory converter engine 210 sorting the two points 420*b*, 510*a* to determine the position (e.g., order) of the points in the higher resolution absolute path 500, the close point engine 350 of the backup trajectory converter engine 210 can calculate a point 710 that is located on a segment formed from points 420*b* ($p_1$) and 510*b* ($p_2$) and that is located closest to the vehicle pose 610 ($p_3$). FIG. 8 shows an example of a portion 800 of the higher resolution absolute path 500 with the determined point 710 (which may be referred to as a measurement point) that is located on the segment formed from points 420*b* ($p_1$) and 510*b* ($p_2$) and is located closest to the vehicle pose 610 ($p_3$). In FIG. 8, an angle θ is located between a segment formed between the vehicle pose 610 ($p_3$) and the measurement point 710 ($p_4$) and the segment formed between the points 420*b* ($p_1$) and 510*b* ($p_2$). The angle θ may be equal to ninety (90) degrees. In one or more aspects, the close point engine 350 of the backup trajectory converter engine 210 may calculate the point 710 ($p_4$) by using the following equations:

$$a=(p_2{\cdot}x-p_1{\cdot}x)^2+(p_2{\cdot}y-p_1{\cdot}y)^2$$

$$b=(p_2{\cdot}x-p_1{\cdot}x)*(p_1{\cdot}x-p_3{\cdot}x)+(p_2{\cdot}Y-p_1{\cdot}y)*(p_1{\cdot}y-p_3{\cdot}Y)$$

$$t=-b/a$$

$$p_4{\cdot}x=p_1{\cdot}x+(p_2{\cdot}x-p_1{\cdot}x)*t$$

$$p_4{\cdot}y=p_1{\cdot}y+(p_2{\cdot}y-p_1{\cdot}y)*t,$$

where, $p_1.x$ is the x coordinate of ($p_1$), $p_1.y$ is the y coordinate of ($p_1$), $p_2.x$ is the x coordinate of ($p_2$), $p_2.y$ is the y coordinate of ($p_2$), $p_3.x$ is the x coordinate of ($p_3$), $p_3.y$ is the y coordinate of ($p_3$), $p_4.x$ is the x coordinate of ($p_4$), and $p_4.y$ is the y coordinate of ($p_4$). The point 820 ($p_5$) can be interpolated from the trajectory the plurality of points 420*a*, 510*a*, 420*b* ($p_1$), 510*b* ($p_2$), 420*c*, 510*c*, and 420*d* using point 710 ($p_4$).

Figure 9:
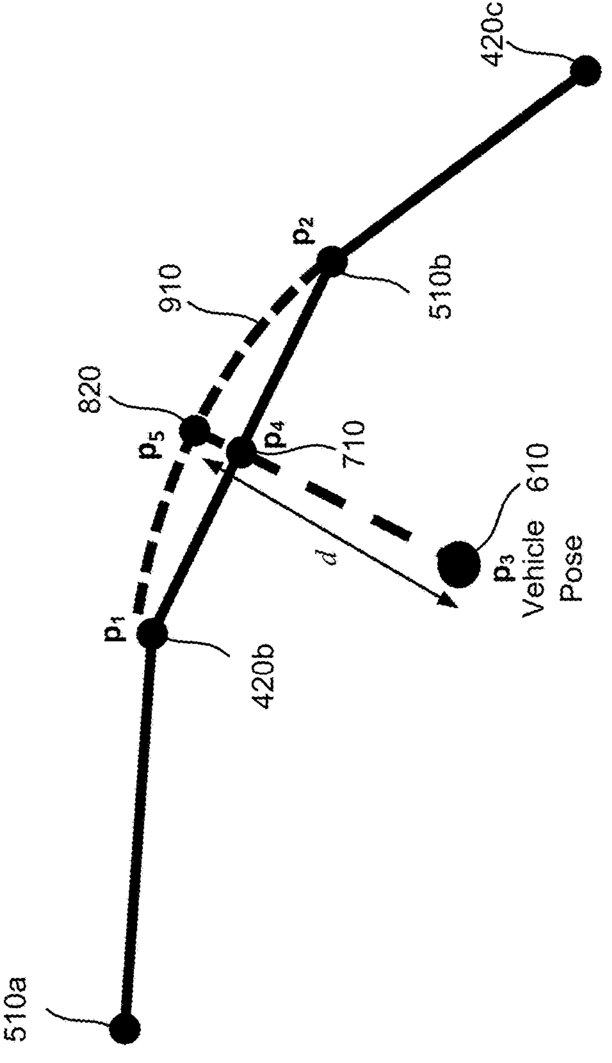
FIG. 9 is a diagram illustrating a sixth step of logic that may be performed by a backup trajectory converter engine, where a lateral offset of the vehicle is determined, in accordance with some aspects of the present disclosure.

The lateral and heading offset engine 360 of the backup trajectory converter engine 210 may determine a lateral offset (d) such that the lateral offset (d) takes into account the curvature 910 of the portion 800 of the higher resolution absolute path 500. As such, the lateral and heading offset engine 360 of the backup trajectory converter engine 210 can calculate a lateral offset (d) located between the point 820 ($p_5$) and the vehicle pose 610 ($p_3$). FIG. 9 shows an example of a portion 800 of the higher resolution absolute path 500, which may contain a curvature 910 between the points 420*b* ($p_1$) and 510*b* ($p_2$). FIG. 9 also shows the determined lateral offset (e.g., denoted by d) that is located between the vehicle pose 610 ($p_3$) and the point 820 ($p_5$). In one or more aspects, the lateral and heading offset engine 360 of the backup trajectory converter engine 210 may calculate the lateral offset (d) by using the following equation:

$$d=\sqrt{(p_5{\cdot}x-p_3{\cdot}x)^2+(p_5{\cdot}y-p_3{\cdot}y)^2}$$

The lateral and heading offset engine 360 of the backup trajectory converter engine 210 can calculate the heading offset by using an interpolated heading from the points 420*b* ($p_1$), 510*b* ($p_2$) and the vehicle pose 610 ($p_3$). In one example, the heading offset is equal to the difference in the angle of the direction of the vehicle with respect to the direction of the point 420*b* ($p_1$), the point 510*b* ($p_2$), and the point 820 ($p_5$) in the path (e.g., in the portion 800 of the higher resolution absolute path 500).

Figure 10:
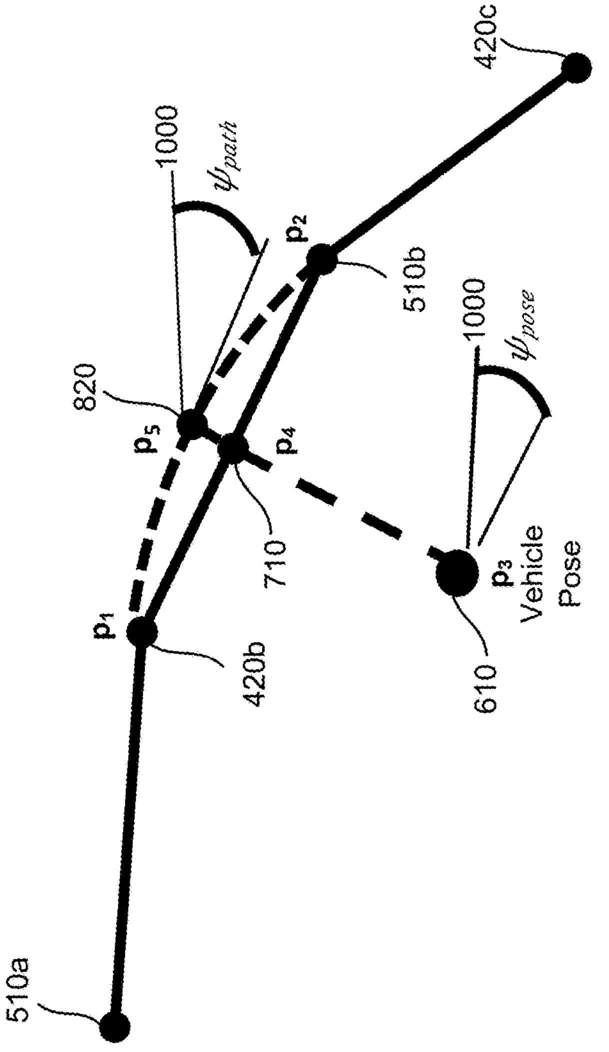
FIG. 10 is a diagram illustrating a seventh step of logic that may be performed by a backup trajectory converter engine, where a heading offset of the vehicle is determined, in accordance with some aspects of the present disclosure.
Figure 10:

The heading offset can indicate how misaligned (or aligned) the vehicle heading is with respect to the path. For example, the vehicle may be located at the correct pose position, but the vehicle may be misaligned with the path. For example, instead of the vehicle moving in the direction of the path, the vehicle may be moving in a direction that crosses (e.g., does not follow) the path. The heading offset can be used to determine whether the vehicle is adequately following the path. In one or more aspects, the heading offset can be equal to $\psi_{path}$ minus $\psi_{pose}$. FIG. 10 shows an example of the portion 800 of the higher resolution absolute path 500 denoting the angles $\psi_{path}$ and $\psi_{pose}$ with respect to the vehicle pose 610 ($p_3$) and the points 420*b* ($p_1$) and 510*b* ($p_2$). As seen in FIG. 10, the angle $\psi_{path}$ can be an angle between the direction of the path and a reference direction 1000. The angle $\psi_{pose}$ can be an angle between the direction of the vehicle and the reference direction 1000. In FIG. 10, the reference direction 1000 is in a horizontal reference direction.

Figure 11:
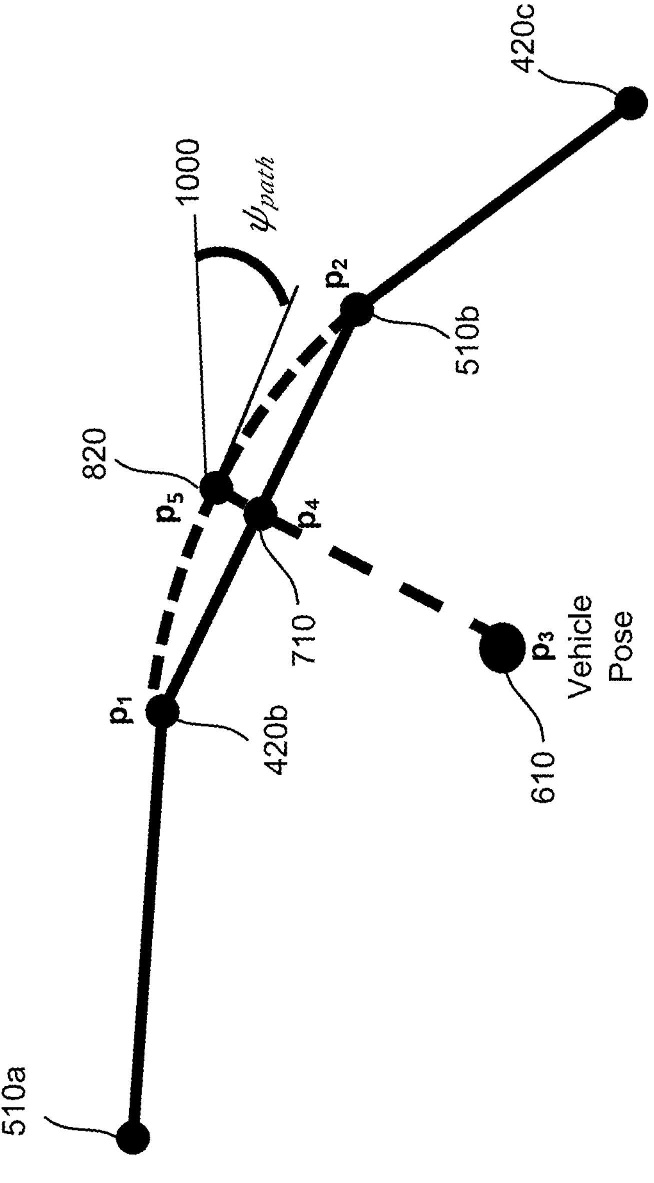
FIG. 11 is a diagram illustrating an eighth step of logic that may be performed by a backup trajectory converter engine, where a curvature of the path is determined, in accordance with some aspects of the present disclosure.

The curvature engine 370 of the backup trajectory converter engine 210 can calculate the curvature of the path by interpolating the point 710 ($p_4$) on the path closest to the vehicle pose 610 ($p_3$) with respect to the trajectory points (e.g., points 420*a*, 420*b*, 420*c*, 420*d* of FIG. 4). The curvature is the rate of change of the angle $\psi_{path}$ with respect to the longitudinal distance. The rate of change shows how much the points 420*b* ($p_1$), 510*b* ($p_2$) are moving from left to right of the initial path (e.g., the higher resolution absolute path 500). FIG. 11 shows an example of the portion 800 of the higher resolution absolute path 500 denoting the angle $\psi_{path}$. The curvature engine 370 of the backup trajectory converter engine 210 may calculate the curvature by using the following equation:

$$\frac{d\psi_{path}}{ds},$$

where $\psi_{path}$ is equal to the angle of the path, and s is equal to the longitudinal distance of the path.

Then, based on the engines (e.g., the converter engine 310, interpolator engine 320, point finder engine 330, sorting engine 340, close point engine 350, lateral and heading offset engine 360, and curvature engine 370) of the backup trajectory converter engine 210 performing their respective determinations (e.g., calculations), the backup trajectory converter engine 210 can output the determined backup path 270 with the determined curvature, lateral offset, and heading offset.

The curvature, lateral offset, and heading offset may be passed from the backup trajectory converter engine 210 to the lateral controller engine 230. Based on the lateral controller engine 230 receiving these parameters, the lateral controller engine 230 can use these parameters to determine a steering wheel angle or pinion angle for the vehicle in order to bring the vehicle pose 610 ($p_3$) closer to the point 820 (p5).

Figure 12:
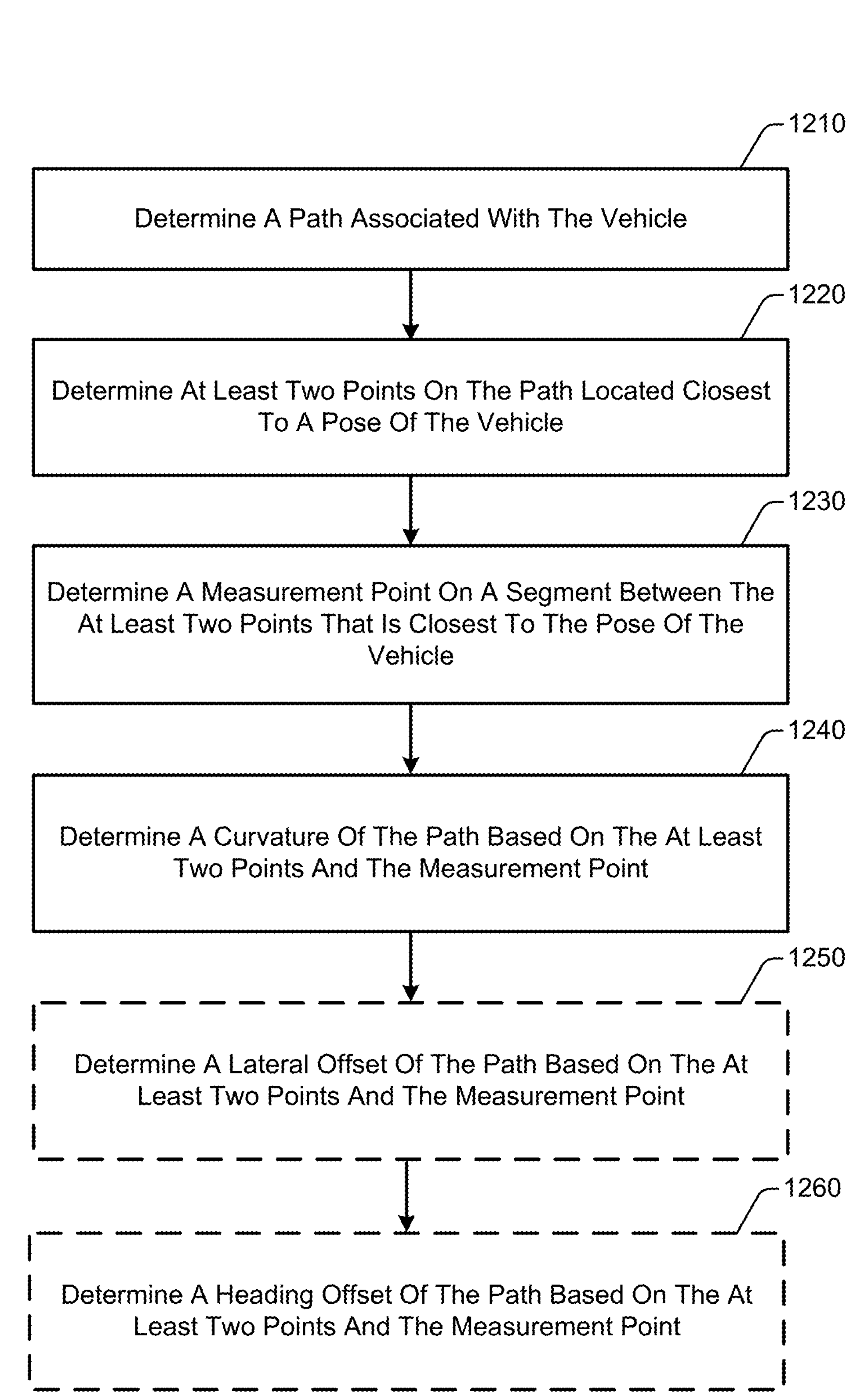
FIG. 12 is a flow diagram illustrating an example of a process to generate a path for controlling one or more operations of a vehicle, in accordance with some aspects of the present disclosure.

FIG. 12 is a flow diagram illustrating an example of a process 1200 to generate a path for controlling one or more operations of a vehicle according to one or more aspects described herein. According to aspects described herein, the process 1200 may be performed by a component or subcomponent of the controller of the vehicle (e.g., backup trajectory converter of the controller of the vehicle), such as backup trajectory converter engine 210 of FIGS. 2 and 3, or other controller described herein.

At block 1210, the vehicle (or component thereof) may determine a path associated with the vehicle. At block 1220, the vehicle (or component thereof) may determine at least two points on the path located closest to a pose of the vehicle. At block 1230, the vehicle (or component thereof) may determine a measurement point on a segment between the at least two points that is closest to the pose of the vehicle. In some aspects, the vehicle (or component thereof) may convert trajectory points into a plurality of trajectory segments. In some cases, the vehicle (or component thereof) may determine the path by converting the plurality of trajectory segments to an absolute path in an absolute coordinate frame. As described above, an absolute path is a sequence of points (delta points) that form a single trajectory in an absolute frame (e.g., where the coordinate system is not dependent on the vehicle position). The absolute path can be generated by incrementally concatenating segments that include the delta points in x, y coordinates (e.g., as shown in FIG. 4). For example, each delta point may be obtained as a distance in x- and y-directions from a previous delta point. The absolute path may be generated or determined by incrementally concatenating the delta points to create the single trajectory.

In some examples, the vehicle (or component thereof) may determine the path by interpolating the trajectory points on the absolute path to generate one or more interpolated points. In such examples, the determined path includes the one or more interpolated points and the trajectory points. In some aspects, the at least two points are determined from the one or more interpolated points.

At block 1240, the vehicle (or component thereof) may determine a curvature of the path based on the at least two points and the measurement point. In some cases, to determine the curvature of the path, the vehicle (or component thereof) may determine a rate of change of an angle of a direction of the at least two points with respect to a longitudinal distance of the path. In some aspects, at block 1250, the vehicle (or component thereof) may determine a lateral offset of the path based on the at least two points and the measurement point. For example, the vehicle (or component thereof) may determine the lateral offset between an additional measurement point and the pose of the vehicle. The vehicle (or component thereof) may determine the additional measurement point by interpolating the path with the measurement point. In some aspects, at block 1260, the vehicle (or component thereof) may determine a heading offset of the path based on the at least two points and the measurement point. For example, the vehicle (or component thereof) may determine the heading offset of the vehicle relative to the path based on a difference between an angle of a direction of the vehicle and an angle of a direction of the at least two points.

Figure 13:
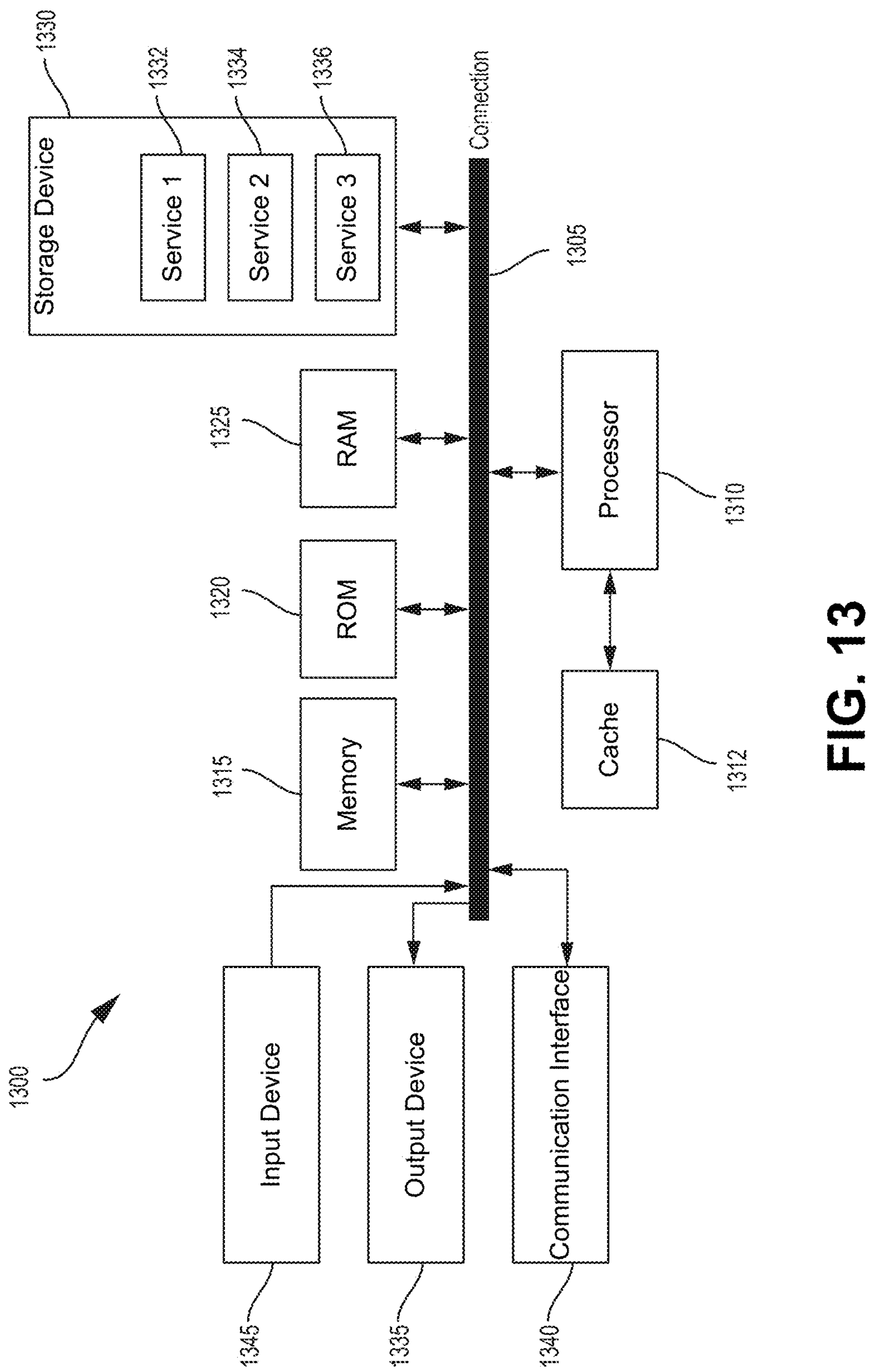
FIG. 13 is a block diagram illustrating an example of a computing system, in accordance with some aspects of the present disclosure.

FIG. 13 is a diagram illustrating an example of a system for implementing certain aspects of the present technology. In particular, FIG. 13 illustrates an example of computing system 1300, which may be for example any computing device making up internal computing system, a remote computing system, a camera, or any component thereof in which the components of the system are in communication with each other using connection 1305. Connection 1305 may be a physical connection using a bus, or a direct connection into processor 1310, such as in a chipset architecture. Connection 1305 may also be a virtual connection, networked connection, or logical connection.

In some aspects, computing system 1300 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 1300 includes at least one processing unit (CPU or processor) 1310 and connection 1305 that communicatively couples various system components including system memory 1315, such as read-only memory (ROM) 1320 and random access memory (RAM) 1325 to processor 1310. Computing system 1300 may include a cache 1312 of high-speed memory connected directly with, in close proximity to, or integrated as part of processor 1310.

Processor 1310 may include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which may represent any number of input mechanisms, such as a microphone for speech, a touch-sensitive screen for gesture or graphical input, keyboard, mouse, motion input, speech, etc. Computing system 1300 may also include output device 1335, which may be one or more of a number of output mechanisms. In some instances, multimodal systems may enable a user to provide multiple types of input/output to communicate with computing system 1300.

Computing system 1300 may include communications interface 1340, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L#) cache), resistive random-access memory (RRAM/ReRAM), phase change memory (PCM), spin transfer torque RAM (STT-RAM), another memory chip or cartridge, and/or a combination thereof.

The storage device 1330 may include software services, servers, services, etc., that when the code that defines such software is executed by the processor 1310, it causes the system to perform a function. In some aspects, a hardware service that performs a particular function may include the software component stored in a computer-readable medium in connection with the necessary hardware components, such as processor 1310, connection 1305, output device 1335, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative Aspects of the disclosure include:

Aspect 1. A method for controlling one or more operations of a vehicle, comprising: determining a path associated with the vehicle; determining at least two points on the path located closest to a pose of the vehicle; determining a measurement point on a segment between the at least two points that is closest to the pose of the vehicle; and determining a curvature of the path based on the at least two points and the measurement point.

Aspect 2. The method of Aspect 1, further comprising converting trajectory points into a plurality of trajectory segments.

Aspect 3. The method of Aspect 2, further comprising determining the path by converting the plurality of trajectory segments to an absolute path in an absolute coordinate frame.

Aspect 4. The method of Aspect 3, further comprising: determining the path by interpolating the trajectory points on the absolute path to generate one or more interpolated points, wherein the determined path includes the one or more interpolated points and the trajectory points.

Aspect 5. The method of Aspect 4, wherein the at least two points are determined from the one or more interpolated points.

Aspect 6. The method of any one of Aspects 1 to 5, further comprising determining a lateral offset between an additional measurement point and the pose of the vehicle.

Aspect 7. The method of Aspect 6, further comprising determining the additional measurement point by interpolating the path with the measurement point.

Aspect 8. The method of any one of Aspects 1 to 7, further comprising determining a heading offset of the vehicle relative to the path based on a difference between an angle of a direction of the vehicle and an angle of a direction of the at least two points.

Aspect 9. The method of any one of Aspects 1 to 8, wherein determining the curvature of the path comprises determining a rate of change of an angle of a direction of the at least two points with respect to a longitudinal distance of the path.

Aspect 10. An apparatus for controlling one or more operations of a vehicle, the apparatus comprising: at least one memory; and at least one processor coupled to the at least one memory and configured to: determine a path associated with the vehicle; determine at least two points on the path located closest to a pose of the vehicle; determine a measurement point on a segment between the at least two points that is closest to the pose of the vehicle; and determine a curvature of the path based on the at least two points and the measurement point.

Aspect 11. The apparatus of Aspect 10, wherein the at least one processor is configured to convert trajectory points into a plurality of trajectory segments.

Aspect 12. The apparatus of Aspect 11, wherein the at least one processor is configured to determine the path by converting the plurality of trajectory segments to an absolute path in an absolute coordinate frame.

Aspect 13. The apparatus of Aspect 12, wherein the at least one processor is configured to: determine the path by interpolating the trajectory points on the absolute path to generate one or more interpolated points, wherein the determined path includes the one or more interpolated points and the trajectory points.

Aspect 14. The apparatus of Aspect 13, wherein the at least two points are determined from the one or more interpolated points.

Aspect 15. The apparatus of any one of Aspects 10 to 14, wherein the at least one processor is configured to determine a lateral offset between an additional measurement point and the pose of the vehicle.

Aspect 16. The apparatus of Aspect 15, wherein the at least one processor is configured to determine the additional measurement point by interpolating the path with the measurement point.

Aspect 17. The apparatus of any one of Aspects 10 to 16, wherein the at least one processor is configured to determine a heading offset of the vehicle relative to the path based on a difference between an angle of a direction of the vehicle and an angle of a direction of the at least two points.

Aspect 18. The apparatus of any one of Aspects 10 to 17, wherein, to determine the curvature of the path, the at least one processor is configured to determine a rate of change of an angle of a direction of the at least two points with respect to a longitudinal distance of the path.

Aspect 19. The apparatus of any one of Aspects 10 to 18, wherein the apparatus is the vehicle.

Aspect 20. The apparatus of any one of Aspects 10 to 18, wherein the apparatus is a component of a vehicle controller of the vehicle.

Aspect 21. The apparatus of Aspect 20, wherein the component of the vehicle controller includes a backup trajectory converter.

Aspect 22. A non-transitory computer-readable medium having stored thereon instructions that, when executed by one or more processors, cause the one or more processors to perform operations according to any of Aspects 1 to 21.

Aspect 23. An apparatus for generating virtual content in a distributed system, the apparatus including one or more means for performing operations according to any of Aspects 1 to 21.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. A method for controlling one or more operations of a vehicle, comprising:

determining a path associated with the vehicle using a plurality of points;

determining two points of the plurality of points on the path located closest to a pose of the vehicle;

determining a first measurement point on a segment between the two points;

determining a second measurement point based on the plurality of points and the first measurement point;

determining a curvature of the path that passes through the two points and the second measurement point; and steering the vehicle along a steering wheel angle determined from the curvature of the path.

2. The method of claim 1, further comprising converting trajectory points of the plurality of points into a plurality of trajectory segments that comprises the segment between the two points.

3. The method of claim 2, further comprising determining the path by converting the plurality of trajectory segments to an absolute path in an absolute coordinate frame.

4. The method of claim 3, further comprising:

determining the path by interpolating the trajectory points on the absolute path to generate one or more interpolated points of the plurality of points.

5. The method of claim 4, wherein one point of the two points is determined from the one or more interpolated points.

6. The method of claim 1, further comprising determining a lateral offset between the second measurement point and the pose of the vehicle.

7. The method of claim 1, further comprising determining a heading offset of the vehicle relative to the path based on a difference between an angle of a direction of the vehicle and an angle of a direction of the two points.

8. The method of claim 1, wherein determining the curvature of the path comprises determining a rate of change of an angle of a direction of the two points with respect to a longitudinal distance of the path.

9. An apparatus for controlling one or more operations of a vehicle, the apparatus comprising:

at least one memory; and at least one processor coupled to the at least one memory and configured to:

determine a path associated with the vehicle using a plurality of points;

determine two points of the plurality of points on the path located closest to a pose of the vehicle;

determine a first measurement point on a segment between the two points;

determine a second measurement point based on the plurality of points and the first measurement point;

determine a curvature of the path that passes through the two points and the second measurement point; and steer the vehicle along a steering wheel angle determined from the curvature of the path.

10. The apparatus of claim 9, wherein the at least one processor is configured to convert trajectory points of the plurality of points into a plurality of trajectory segments that comprises the segment between the two points.

11. The apparatus of claim 10, wherein the at least one processor is configured to determine the path by converting the plurality of trajectory segments to an absolute path in an absolute coordinate frame.

12. The apparatus of claim 11, wherein the at least one processor is configured to:

determine the path by interpolating the trajectory points on the absolute path to generate one or more interpolated points of the plurality of points.

13. The apparatus of claim 12, wherein one point of the two points is determined from the one or more interpolated points.

14. The apparatus of claim 9, wherein the at least one processor is configured to determine a lateral offset between the second measurement point and the pose of the vehicle.

15. The apparatus of claim 9, wherein the at least one processor is configured to determine a heading offset of the vehicle relative to the path based on a difference between an angle of a direction of the vehicle and an angle of a direction of the two points.

16. The apparatus of claim 9, wherein, to determine the curvature of the path, the at least one processor is configured to determine a rate of change of an angle of a direction of the two points with respect to a longitudinal distance of the path.

17. The apparatus of claim 9, wherein the apparatus is the vehicle.

18. The apparatus of claim 9, wherein the apparatus is a component of a vehicle controller of the vehicle.

19. The apparatus of claim 18, wherein the component of the vehicle controller includes a backup trajectory converter.

20. A non-transitory computer-readable medium of a vehicle, the non-transitory computer-readable medium having stored thereon instructions that, when executed by one or more processors, cause the one or more processors to:

determine a path associated with the vehicle using a plurality of points;

determine two points of the plurality of points on the path located closest to a pose of the vehicle;

determine a first measurement point on a segment between the two points;

determine a second measurement point based on the plurality of points and the first measurement point;

determine a curvature of the path that passes through the two points and the second measurement point; and steer the vehicle along a steering wheel angle determined from the curvature of the path.

21. The non-transitory computer-readable medium of claim 20, wherein the instructions, when executed by the one or more processors, cause the one or more processors to convert trajectory points of the plurality of points into a plurality of trajectory segments that comprises the segment between the two points.

22. The non-transitory computer-readable medium of claim 21, wherein the instructions, when executed by the one or more processors, cause the one or more processors to determine the path by converting the plurality of trajectory segments to an absolute path in an absolute coordinate frame.

23. The non-transitory computer-readable medium of claim 22, wherein the instructions, when executed by the one or more processors, cause the one or more processors to:

determine the path by interpolating the trajectory points on the absolute path to generate one or more interpolated points of the plurality of points.

24. The non-transitory computer-readable medium of claim 23, wherein one point of the two points is determined from the one or more interpolated points.

25. The non-transitory computer-readable medium of claim 20, wherein the instructions, when executed by the one or more processors, cause the one or more processors to determine a lateral offset between the second measurement point and the pose of the vehicle.

26. The non-transitory computer-readable medium of claim 20, wherein the instructions, when executed by the one or more processors, cause the one or more processors to determine a heading offset of the vehicle relative to the path based on a difference between an angle of a direction of the vehicle and an angle of a direction of the two points.

27. The non-transitory computer-readable medium of claim 20, wherein, to determine the curvature of the path, the instructions, when executed by the one or more processors, cause the one or more processors to determine a rate of change of an angle of a direction of the two points with respect to a longitudinal distance of the path.

* * * * *